(12) United States Patent
Awad

(10) Patent No.: US 10,355,773 B1
(45) Date of Patent: Jul. 16, 2019

(54) CONNECTIVITY SYSTEM AND METHOD FOR HIGH SPEED AIRCRAFT INTERNET

(71) Applicant: Talal Awad, Orlando, FL (US)

(72) Inventor: Talal Awad, Orlando, FL (US)

( * ) Notice: Subject to any disclaimer, the term of this patent is extended or adjusted under 35 U.S.C. 154(b) by 0 days.

(21) Appl. No.: 16/238,195

(22) Filed: Jan. 2, 2019

Related U.S. Application Data

(60) Provisional application No. 62/612,810, filed on Jan. 2, 2018.

(51) Int. Cl.
*H04N 7/18* (2006.01)
*H04B 7/185* (2006.01)
*H04L 29/12* (2006.01)
*H04L 29/06* (2006.01)
*H04L 29/08* (2006.01)

(52) U.S. Cl.
CPC ... *H04B 7/18508* (2013.01); *H04L 29/08972* (2013.01); *H04L 61/2567* (2013.01); *H04L 63/0428* (2013.01)

(58) Field of Classification Search
CPC .................................................. H04B 7/18508
See application file for complete search history.

(56) References Cited

U.S. PATENT DOCUMENTS

| | | | | |
|---|---|---|---|---|
| 6,529,706 B1 * | 3/2003 | Mitchell | ............ | H04B 7/18508 370/316 |
| 6,741,841 B1 * | 5/2004 | Mitchell | ............ | H04B 7/18508 348/E7.093 |
| 7,599,691 B1 * | 10/2009 | Mitchell | ................ | G06Q 30/02 455/3.02 |
| 8,176,520 B1 * | 5/2012 | Mitchell | .................. | H04N 7/18 725/76 |
| 8,219,799 B1 * | 7/2012 | Lucchesi | ............... | H04L 63/105 713/150 |
| 8,499,324 B1 * | 7/2013 | Mitchell | ............ | H04B 7/18508 709/219 |
| 9,100,361 B1 * | 8/2015 | Lucchesi | ................. | H04L 63/00 |
| 9,221,553 B1 * | 12/2015 | Mitchell | ................ | B64D 45/00 |
| 9,307,297 B2 | 4/2016 | Richman et al. | | |
| 9,425,888 B2 | 8/2016 | Tong et al. | | |
| 9,473,647 B2 * | 10/2016 | Davis | ..................... | H04M 7/128 |
| 9,531,993 B1 * | 12/2016 | Wiseman | ............... | H04N 7/025 |
| 2003/0055975 A1 * | 3/2003 | Nelson | ............... | H04B 7/18506 709/227 |

(Continued)

*Primary Examiner* — Parth Patel
(74) *Attorney, Agent, or Firm* — Global Intellectual Property Agency, LLC; Daniel Boudwin

(57) ABSTRACT

A device and method for connecting users to the Internet via a high-speed connection aboard an aircraft. The device includes a control unit designed to attach to a data transmission system of an aircraft, the data transmission system having an electrical system with a circuit. The device additionally comprises a logic that is at least partially stored in a non-transitory computer readable medium and that, when executed at least in part by a processor, causes the device to perform a method. The method includes detecting a connection request from an electronic device, identifying the IP address associated with it, communicating the IP address to an onboard server, transmitting the IP address to a broadband server, recording and storing the IP address, and remapping the IP address to an anonymized IP address prior to sending the connection to a ground server over satellite connection.

7 Claims, 3 Drawing Sheets

(56) References Cited

U.S. PATENT DOCUMENTS

| | | | |
|---|---|---|---|
| 2004/0198386 A1* | 10/2004 | Dupray | H04W 64/00 455/456.1 |
| 2008/0005264 A1* | 1/2008 | Brunell | G06F 21/6254 709/217 |
| 2010/0017600 A1* | 1/2010 | Lepeska | H04L 67/06 713/163 |
| 2010/0189089 A1* | 7/2010 | Lynch | H04B 7/18506 370/338 |
| 2010/0233956 A1* | 9/2010 | Hunziker | G08B 21/0415 455/40 |
| 2010/0265876 A1* | 10/2010 | Foxworthy | H04B 7/18582 370/316 |
| 2010/0265877 A1* | 10/2010 | Foxworthy | H04L 12/4645 370/316 |
| 2010/0265941 A1* | 10/2010 | Foxworthy | H04B 7/18595 370/389 |
| 2011/0116373 A1* | 5/2011 | Lauer | H01Q 1/007 370/232 |
| 2011/0153367 A1* | 6/2011 | Amigo | G06Q 40/08 705/4 |
| 2011/0202427 A1* | 8/2011 | Garcia Jurado Suarez | G06F 21/42 705/26.35 |
| 2011/0263199 A1* | 10/2011 | Cruz | H04B 7/18506 455/12.1 |
| 2012/0303826 A1* | 11/2012 | Nelson | H04B 7/18506 709/228 |
| 2013/0028174 A1* | 1/2013 | Cabos | H04L 51/063 370/316 |
| 2013/0028421 A1* | 1/2013 | Feng | H04W 12/04 380/270 |
| 2013/0060869 A1* | 3/2013 | Davis | G06Q 10/107 709/206 |
| 2013/0205384 A1* | 8/2013 | Debaille | H04B 7/18508 726/13 |
| 2013/0285855 A1* | 10/2013 | Dupray | G01S 19/48 342/451 |
| 2015/0170031 A1* | 6/2015 | Attar | G07C 5/0858 706/46 |
| 2015/0221141 A1* | 8/2015 | Negritto | H04L 67/025 701/31.5 |
| 2015/0358072 A1 | 12/2015 | Lynch et al. | |
| 2016/0006806 A1* | 1/2016 | Abraham | H04L 29/12009 709/203 |
| 2016/0027399 A1* | 1/2016 | Wilde | G06F 13/382 345/520 |
| 2016/0205506 A1* | 7/2016 | Turner | G06F 3/0482 455/456.3 |
| 2016/0260067 A1* | 9/2016 | Holman | G06Q 20/227 |
| 2016/0343044 A1* | 11/2016 | Tucker | G06Q 30/0282 |
| 2016/0360336 A1* | 12/2016 | Gross | H04W 4/025 |
| 2016/0360382 A1* | 12/2016 | Gross | G06F 3/0488 |
| 2017/0063944 A1* | 3/2017 | Nyikos | H04L 65/4069 |
| 2017/0309172 A1* | 10/2017 | Linder | G08G 1/0133 |
| 2018/0020042 A1* | 1/2018 | Couleaud | H04L 67/06 |
| 2018/0268168 A1* | 9/2018 | Herlocker | G06F 21/6254 |
| 2018/0287692 A1* | 10/2018 | Matyas | H04B 7/18508 |
| 2018/0324802 A1* | 11/2018 | Watts | H04W 72/0453 |
| 2019/0012752 A1* | 1/2019 | Rockafellow | G06Q 50/184 |
| 2019/0014371 A1* | 1/2019 | Couleaud | H04N 21/426 |
| 2019/0037358 A1* | 1/2019 | Jenkins | H04W 4/025 |
| 2019/0051046 A1* | 2/2019 | Jin | G06T 17/20 |

* cited by examiner

CONNECTIVITY SYSTEM AND METHOD FOR HIGH SPEED AIRCRAFT INTERNET

CROSS REFERENCE TO RELATED APPLICATIONS

This application claims the benefit of U.S. Provisional Application No. 62/612,810 filed on Jan. 2, 2018. The above identified patent application is herein incorporated by reference in its entirety to provide continuity of disclosure.

BACKGROUND OF THE INVENTION

The present invention relates to aircraft data transmission devices. More specifically, the invention provides a connectivity system and method for high speed aircraft internet configured to remap an IP address from a user to an anonymized IP address prior to quickly transmitting the data requested from the user onboard an aircraft.

Many commercial airlines provide access to the internet for customers aboard the aircraft, however these connections can be ineffective. Connection speeds are often slow due to increased use by multiple users aboard the plane as well as poor satellite connectivity systems installed within the aircraft. Additionally, the connections can be unsafe, as data transfers can be lost over unsecured networks or traveling on unsecured channels. Thus, an improved connectivity system and method for high speed aircraft internet that can efficiently and securely access the internet on board an aircraft is desired.

SUMMARY OF THE INVENTION

In view of the foregoing disadvantages inherent in the known types of aircraft data transmission devices now present in the known art, the present invention provides a connectivity system and method for high speed aircraft internet wherein the same can be utilized for providing convenience for the user when desiring to quickly and securely access and browse the internet aboard an aircraft.

The present system comprises a connectivity system and method for high speed aircraft internet implemented by a device such as a microchip. The device comprises a control unit configured to attach to a data transmission system of an aircraft, the data transmission system comprising an electrical system with a circuit therein. The device additionally comprises a logic that is at least partially stored in a non-transitory computer readable medium and that, when executed at least in part by a processor, causes the device to perform a method. The device detects a connection request from an electronic device, identifies the IP address associated with it, communicates the IP address to an onboard server, transmits and IP address to a broadband server, records and stores the IP address, and remaps the IP address to an anonymized IP address prior to sending the connection to a ground server over satellite connection. In this way, a user is able to securely and quickly access the internet aboard an aircraft.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
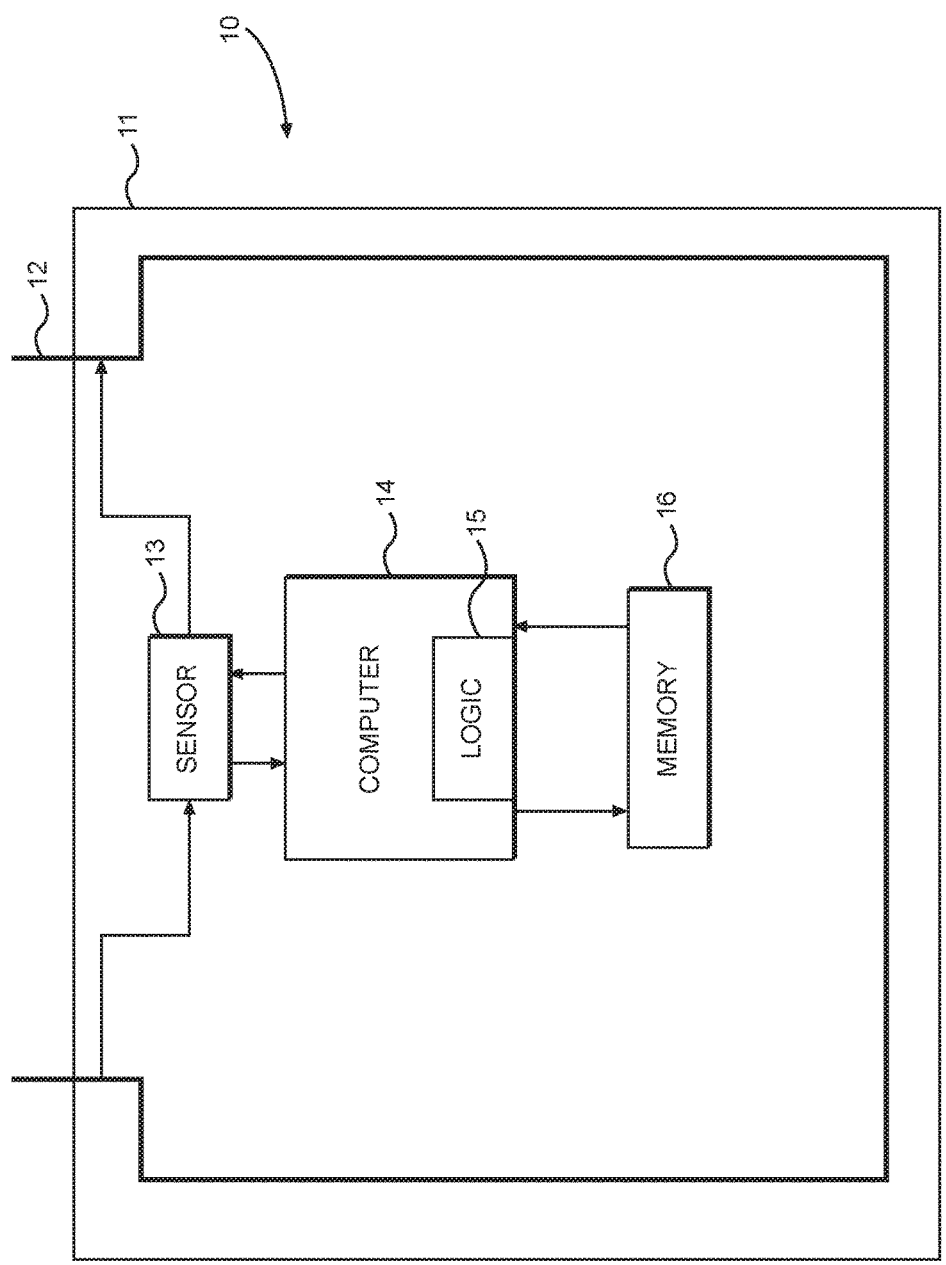
FIG. 1 shows a diagram of an embodiment of the device implementing the connectivity system for high speed aircraft internet.

Reference is made herein to the attached drawings. Like reference numerals are used throughout the drawings to depict like or similar elements of the connectivity system and method for high speed aircraft internet. The figures are intended for representative purposes only and should not be considered to be limiting in any respect.

According to some embodiments, the operations, techniques, and/or components described herein can be implemented as (i) a special-purpose computing device having specialized hardware and a logic hardwired into the computing device to persistently perform the disclosed operations and/or techniques, or (ii) a logic that is implementable on an electronic device having a general-purpose hardware processor to execute the logic and a computer-readable medium, e.g. a memory, wherein implementation of the logic by the processor on the electronic device provides the electronic device with the function of a special-purpose computing device.

In the interests of economy, the present disclosure refers to "a computer-readable medium," "a processor," and so on. However, this should not be read as limiting in any way as the present invention utilizing "one of more computer-readable media," "one or more processors," and so on. Unless specifically limited to a single unit, "a" is intended to be equivalent to "one or more" throughout the present disclosure.

In the interests of economy, the present disclosure refers to a "personal electronic device" or "PED". However, this should not be read as limiting in any way as the present invention utilizing a computer or laptop and so on and should be interpreted to include any electronic device such as a smartphone, tablet, laptop, game device, etc. throughout the present disclosure.

Referring now to FIG. 1, there is shown a diagram of an embodiment of the device implementing the connectivity system for high speed aircraft internet. The connectivity system for high speed aircraft internet device 10 includes a control unit 11 attached to a data transmission system 12 of an aircraft. The control unit 11 has one or more sensors 13 attached to each circuit of the data transmission system 12 of the aircraft. In the illustrated embodiment, the sensor 13 is configured to detect when a personal electronic device of a user requests access to the internet. However, in other embodiments, the sensor 13 is can vary in sensitivity, range and type of characteristics detected, and in the number of sensors 13 on a single circuit.

The control unit 11 additionally comprises a computer 14 that is operably connected to each sensor 13. The sensor 13 transmits the IP address of the personal electronic device to the computer 14 which stores the data in a memory unit 16. The computer 14 embodies a logic 15, which is stored, e.g., on a non-transitory computer readable medium, and executed at least in part by a processor. As used herein, }

"logic" refers to (i) logic implemented as a computer instructions and/or data within one or more computer processes and/or (ii) logic implemented in electronic circuitry.

The computer 14 continuously monitors the requests of users attempting to access the internet via the sensor 13 and stores the IP address data of the requesting user in the memory unit 16. The logic 15 of the computer 14 continuously compares the stored data with newly detected data to ensure the user has not already been distributed an anonymized IP address, and to ensure the anonymized IP address matches the user requesting the connection. When the comparison determines the IP address has not been anonymized, then one or more actions are taken, such as transmitting the IP address to NAT table in the broadband server aboard the aircraft.

Figure 2:
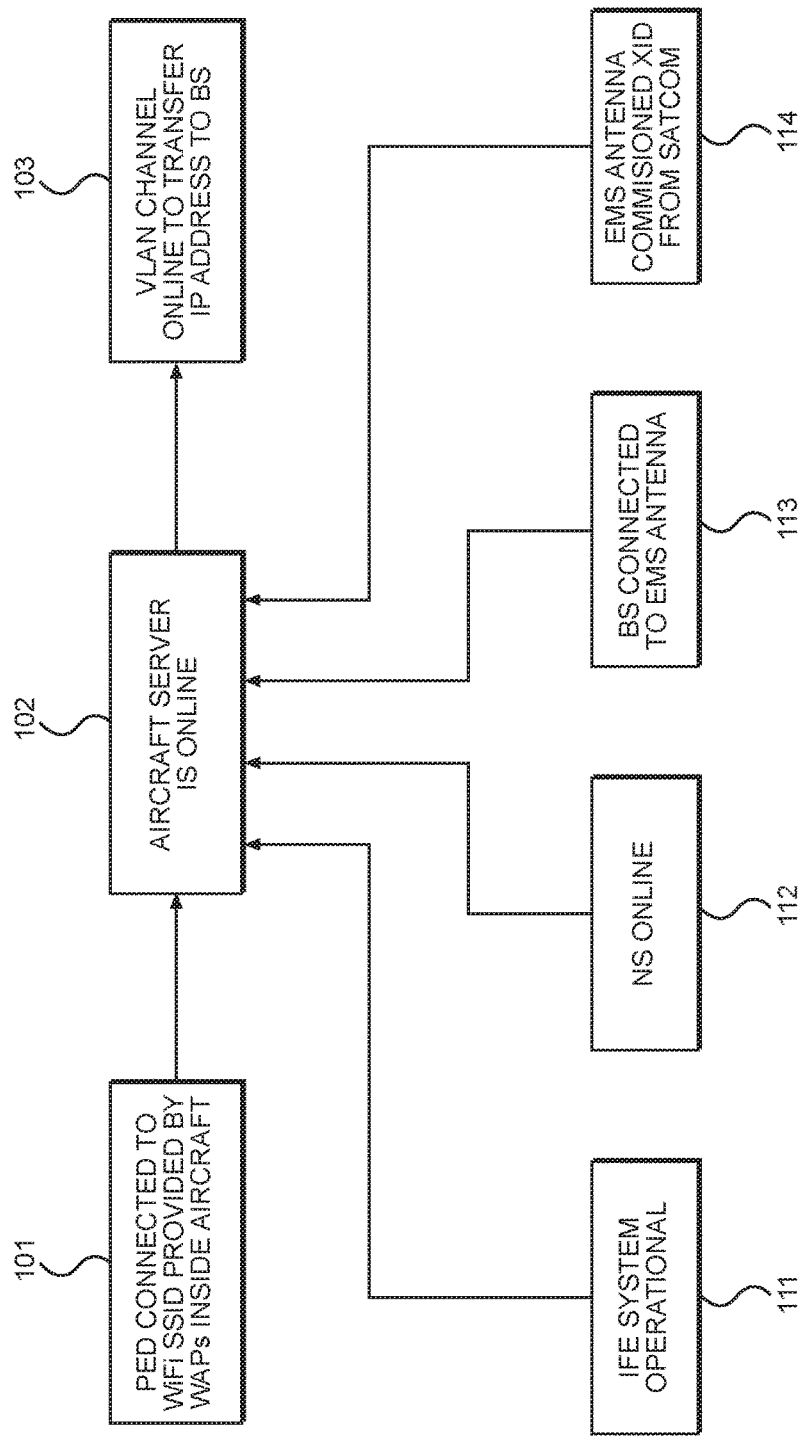
FIG. 2 shows a diagram of an embodiment of a series of prerequisite steps prior to the functioning of the connectivity system and method for high speed aircraft internet.

Referring now to FIG. 2, there is shown a diagram of an embodiment of a series of prerequisite steps required prior to the functioning of the connectivity system and method for high speed aircraft internet. In order for the personal electronic device to go online, thereby necessitating the use of the connectivity system and method for high speed aircraft internet, a series of conditions must be met to ensure the system is in working order.

Prior to remapping the IP, the first step 101 ensures the personal electronic device (PED) is connected to the WiFi SSID onboard the aircraft. In the illustrated embodiment, the WiFi is provided by a plurality of Wireless Access Points (WAPs) disposed within the hull of the aircraft. In the shown embodiment, the PEDs include, but are not limited to, smartphones, tablets, and laptops.

Thus, the second step 102 ensures the aircraft server is online. In the illustrated embodiment, the online functionality of the aircraft server is determined by a series of related checks. The related checks include ensuring the In-Flight Entertainment (IFE) system is operational 111, as well as the In-Flight Entertainment Network Server (NS) having functionality 112. Additionally, the Broadband Server (BS) is online and connected to the EMS Antenna 113 disposed atop the associated aircraft. After determining the EMS Antenna has successfully commissioned a valid XID, wherein the XID is a unique identifier given on certain Satellite Bandwidths, from SATCOM 114, the aircraft server is online and the second step 102 is complete.

Finally, the third step 103 is to ensure a secure channel is online, and ready to be used to transfer the IP addresses of the associated PED, and any additional traffic and data packets after the connection is secured. In the illustrated embodiment, the secure channel comprises a VLAN 4066 channel. However, in other embodiments, any secure channel can be used, provided it provides the necessary security to prevent potential hazards, such as hacking. Thus, it is along the secure channel the IP address will be transferred through the aircraft server to the broadband server (BS).

Figure 3:
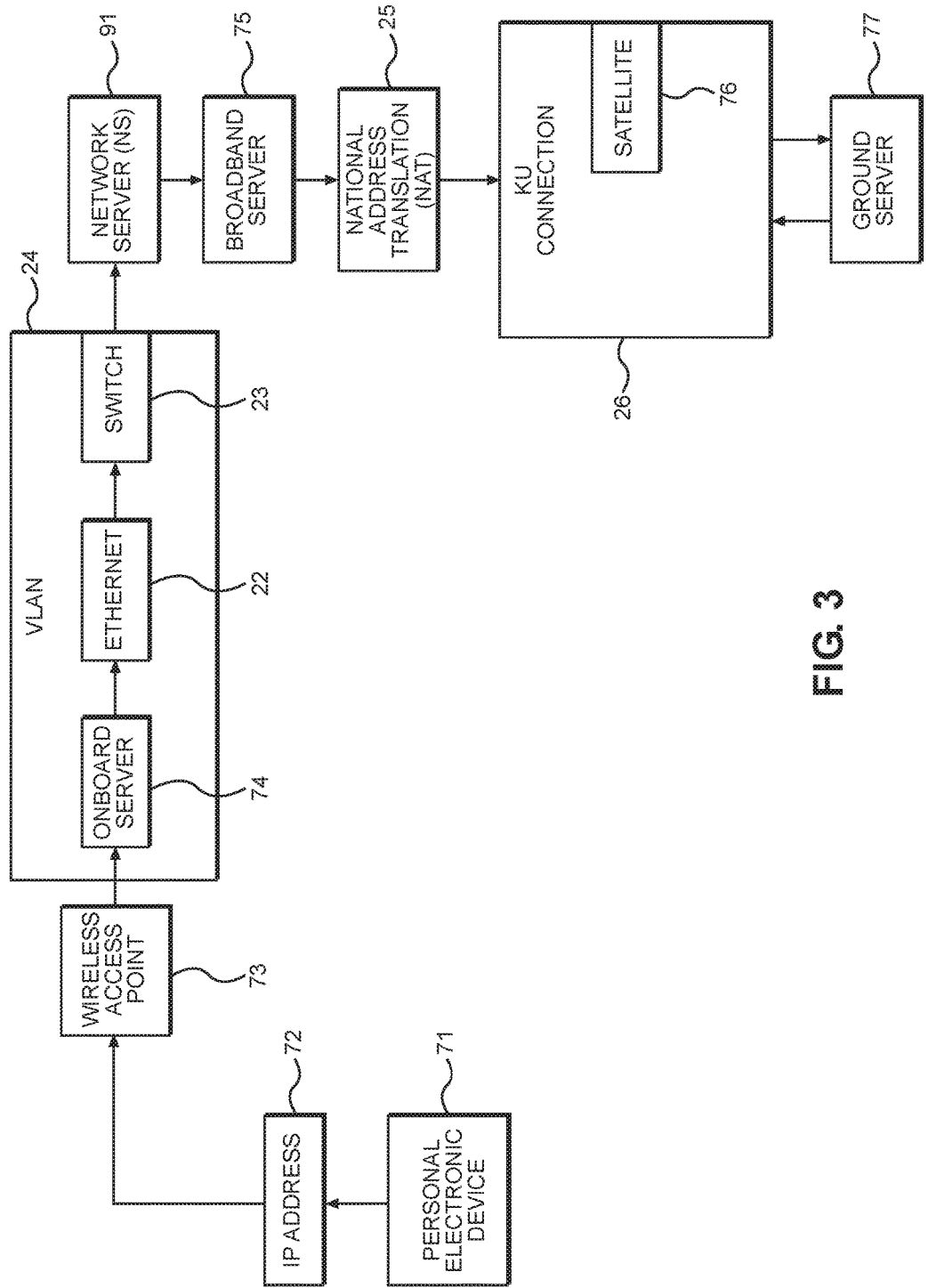
FIG. 3 shows a diagram of an embodiment of the connectivity system and method for high speed aircraft internet transmitting information to and then receiving commands from a user.

Referring now to FIG. 3, there is shown a diagram of an embodiment of the connectivity system and method for high speed aircraft internet transmitting information to and then receiving information from a ground server. The connectivity system and method for high speed aircraft internet includes a sensor configured to determine when a personal electronic device of a user requests access to the internet. In the illustrated embodiment, the user initiates a request to connect their personal electronic device (PED) 71 to the onboard servers 74 of the aircraft via the wireless access points (WAPs) 73 in order to establish a connection to the network.

The connectivity system and method for high speed aircraft internet identifies the IP address 72 associated with the PED 71 used and passes the associated IP address 72 to the WAPs 73 disposed within the aircraft. The WAPs 73 are configured to assign a unique IP address to the associated PED 71 using a DHCP network protocol, and then wirelessly transfer the IP address 72 to the onboard server 74 installed on the aircraft via a secure channel 24. In one embodiment, the onboard server 74 comprises an inflight entertainment network server, as this is the typical onboard server 74 installed within the aircraft. The inflight entertainment network server is thus responsible for hosting the Inflight Entertainment software as well as the IP addresses of all the connected devices within the network. In the illustrated embodiment, the secure channel 24 used to transmit the IP address 72 and data within the aircraft is a VLAN. The VLAN 24 ensures the information transferred to and from the PED 71 inside the aircraft is secure prior to the anonymization of the IP address 72, as well as ensures there is no loss of information. The VLAN 24 is configured to separate traffic, such as IP address and additional data packets, to ensure they transmit and transfer the traffic quickly and safely. Thus, the VLAN 24 is responsible for tagging the IP addresses and data packets transferred therein.

The onboard server 74 is operably connected via physical wiring 22 to a network server (NS) 91 disposed within the aircraft, wherein the NS 91 is operably connected to the broadband server (BS) 75 via an additional physical wire. The physical wiring 22 ensures the information transferred therein is secure from tampering or malicious interference. Additionally, the physical wiring 22 ensures the connection made is reliable and responsive. In the illustrated embodiment, the physical wiring 22 is composed of an ethernet cable, such that the onboard server 74 is operably connected to the NS 91 through an ethernet cable 22, while the NS 91 is connected to the BS 75 via an additional ethernet cable through a separate port.

The connectivity system and method for high speed aircraft internet further comprises a switch 23, wherein the switch 23 is operably connected to the information passed through the ethernet cable 22. The IP address 72, as well as any further data passed therethrough, is disposed into a data packet for discrete transport along the connection service. The switch 23 is configured to tag each data packet as it passes through, such that each data packet is identifiable at a later point.

The broadband server 75 is configured to record and store the data pack and associated IP address 72 for each circuit on a memory unit disposed within the broadband server 75. Additionally, the broadband server 75 contains a network address translation (NAT) table 25 therein. The IP address 72 recorded and stored within the broadband server 75 is remapped to an anonymized IP address according to the NAT tables 75 disposed within the broadband server 75.

The broadband server 75 additionally comprises a sensor configured to convey the anonymized IP address to a ground server 77 via satellite 76, thereby allowing it to function as a connectivity platform. In the shown embodiment, the broadband server 75 is configured to automatically attempt the satellite connection 26 at a height of 20,000 feet. In the illustrated embodiment, the satellite connection 26 comprises a KU connection to provide additional protection and responsiveness to the data sent and received by the users. The KU satellite connection 26 allows the device to establish a fast and secure connection between the ground server 77 and the associated personal electronic device 71. Further, the connection at the ground server 77 includes a plurality of connections to additional Domain Name Servers (DNS) supplied by companies such as Google or Facebook.

With the secure connection established, the device is configured to transfer data requested from the anonymized IP address, and repeating the detecting, the identifying, the recording, the communicating, the transmitting, the remapping, the conveying, the establishing, and the transferring for additional information requested from the personal electronic device of the user.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A connectivity device for high speed aircraft, internet, comprising: a control unit configured to attach to a data transmission system of an aircraft; the data transmission system comprising an electrical system with a circuit therein; a logic that is at least partially stored in a non-transitory computer readable medium and that, when executed at, least in part by a processor, causes the connectivity device for high speed aircraft internet to perform a method, the method comprising: detecting a connection request from a personal electronic device via a wireless access point;
   identifying an IP address associated with the personal electronic device; communicating the IP address to an onboard server over a secure channel; transmitting the IP address to a broadband server via a physical cable; recording and storing the IP address for each circuit on a memory unit; remapping the IP address to an anonymized IP address using a NAT (network address translation) table disposed within the broadband server;
   conveying the anonymized IP address to a ground server via satellite; establishing a secure connection with the ground server to the anonymized IP address of the associated personal electronic device; transferring data requested from the anonymized IP address to the associated persona electronic device over the established secure connection; repeating the detecting, the identifying, the recording, the communicating, the transmitting, the remapping, the conveying, the establishing, the transferring steps for additional data sent from the personal electronic device, respectively, as requested.

2. The connectivity device for high speed aircraft internet of claim 1, wherein the method further comprises:
   translating additional information processed over the physical cable to a secure data packet via a switch.

3. The connectivity device for high speed aircraft internet of claim 1, wherein the conveying is done via a KU connection.

4. The connectivity device for high speed aircraft internet of claim 1, wherein the physical cable comprises an ethernet cable.

5. The connectivity device for high speed aircraft internet of claim 1, wherein the secure channel is VLAN 4066.

6. A method for high speed aircraft internet, comprising:
   detecting a connection request from a personal electronic device via a wireless access point; identifying an IP address associated with the personal electronic device; communicating the IP address to an onboard server over a secure channel;
   transmitting the IP address to a broadband server via a physical cable;
   recording and storing the IP address for each circuit on a memory unit;
   remapping the IP address to an anonymized IP address using a NAT network address translation) table disposed within the broadband server;
   conveying the anonymized IP address to a ground server via satellite; establishing a secure connection with the ground server to the anonymized IP address of the associated personal electronic device;
   transferring data requested from the anonymized IP address to the associated personal electronic device over the established secure connection; repeating the detecting, the identifying, the recording, the communicating, the transmitting, the remapping, the conveying, the establishing, the transferring steps for additional data sent from the personal electronic device, respectively, as requested.

7. The method for high speed aircraft internet of claim 6, further comprising: translating additional information processed over the physical cable to a secure data packet via a switch.

* * * * *